United States Patent
Doerry et al.

(10) Patent No.: US 7,391,357 B1
(45) Date of Patent: Jun. 24, 2008

(54) CORRECTION OF MOTION MEASUREMENT ERRORS BEYOND THE RANGE RESOLUTION OF A SYNTHETIC APERTURE RADAR

(75) Inventors: Armin W. Doerry, Albuquerque, NM (US); Freddie E. Heard, Albuquerque, NM (US); J. Thomas Cordaro, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 364 days.

(21) Appl. No.: 11/243,826

(22) Filed: Oct. 5, 2005

Related U.S. Application Data

(60) Provisional application No. 60/665,318, filed on Mar. 25, 2005.

(51) Int. Cl.
*G01S 13/90* (2006.01)
(52) U.S. Cl. ............ 342/25 F; 342/25 R; 342/179
(58) Field of Classification Search .......... 342/25 F
See application file for complete search history.

(56) References Cited

U.S. PATENT DOCUMENTS

| | | | |
|---|---|---|---|
| 4,005,423 A * | 1/1977 | Webb | 342/194 |
| 5,248,976 A * | 9/1993 | Niho et al. | 342/25 A |
| 5,608,404 A | 3/1997 | Burns et al. | |
| 5,805,099 A * | 9/1998 | Nagata | 342/25 B |
| 7,038,612 B2 * | 5/2006 | Chow et al. | 342/25 F |

OTHER PUBLICATIONS

J. L. Walker, "Range-Doppler Imaging of Rotating Objects," IEEE Trans. on Aerospace and Electronic Systems, AES-16 (1), 23-52, (1980).

D. E. Wahl, P. H. Eichel, D. C. Ghiglia, C. V. Jakowatz Jr., "Phase Gradient Autofocus—A Robust Tool for High Resolution SAR Phase Correction", IEEE Transactions on Aerospace and Electronic Systems, vol. 30, No. 3, pp. 827-834, Jul. 1994.

C. V. Jakowatz Jr., D. E. Wahl, P. H. Eichel, D. G. Ghiglia, P. A. Thompson, *Spotlight-Mode Synthetic Aperture Radar: A Signal Processing Approach*, ISBN 0-7923-9677-4, Kluwer academic Publishers, 1996.

W. G. Carrara, R. S. Goodman, R. M. Majewski, *Spotlight Synthetic Aperture Radar Signal Processing Algorithms*, ISBN 0-89006-728-7, Artech House, Inc., 1995.

M. Denny, I. Scott, "Anomalous Propagation Limitations to High-Resolution SAR Performance", Proceedings of the 2002 IEEE Radar Conference, Long Beach, CA, USA, p. 249-254, Apr. 22-25, 2002.

Junfeng Wang, Xingzhao Liu, "SAR Automatic Range-Migration Correction", Prooceedings of the 2004 IEEE International Geoscience and Remote Sensing Symposium, vol. 6, pp. 3926-3929, Sep. 20-24, 2004, Anchorage, AK, USA.

* cited by examiner

*Primary Examiner*—Thomas H. Tarcza
*Assistant Examiner*—Matthew M Barker
(74) *Attorney, Agent, or Firm*—Scott B. Stahl

(57) ABSTRACT

Motion measurement errors that extend beyond the range resolution of a synthetic aperture radar (SAR) can be corrected by effectively decreasing the range resolution of the SAR in order to permit measurement of the error. Range profiles can be compared across the slow-time dimension of the input data in order to estimate the error. Once the error has been determined, appropriate frequency and phase correction can be applied to the uncompressed input data, after which range and azimuth compression can be performed to produce a desired SAR image.

7 Claims, 7 Drawing Sheets

CORRECTION OF MOTION MEASUREMENT ERRORS BEYOND THE RANGE RESOLUTION OF A SYNTHETIC APERTURE RADAR

CROSS-REFERENCE TO RELATED APPLICATIONS

This application claims the priority under 35 U.S.C. §119 (e)(1) of co-pending provisional application Ser. No. 60/665,318 filed Mar. 25, 2005 and incorporated herein by reference.

STATEMENT REGARDING FEDERALLY SPONSORED RESEARCH OR DEVELOPMENT

This invention was developed under Contract DE-AC04-94AL8500 between Sandia Corporation and the U.S. Department of Energy. The U.S. Government has certain rights in this invention.

FIELD OF THE INVENTION

The invention relates generally to synthetic aperture radar (SAR) and, more particularly, to correction of motion measurement errors in SAR images.

BACKGROUND OF THE INVENTION

The documents listed below are incorporated herein by reference:

[1] J. L. Walker, "Range-Doppler Imaging of Rotating Objects," IEEE Trans. on Aerospace and Electronic Systems, AES-16 (1), 23-52, (1980).
[2] D. E. Wahl, P. H. Eichel, D. C. Ghiglia, C. V. Jakowatz Jr., "Phase Gradient Autofocus—A Robust Tool for High Resolution SAR Phase Correction", IEEE Transactions on Aerospace and Electronic Systems, Vol. 30, No. 3, pp. 827-834, July, 1994.
[3] C. V. Jakowatz Jr., D. E. Wahl, P. H. Eichel, D. G. Ghiglia, P. A. Thompson, Spotlight-Mode Synthetic Aperture Radar: A Signal Processing Approach, ISBN 0-7923-96774, Kluwer academic Publishers, 1996.
[4] W. G. Carrara, R. S. Goodman, R. M. Majewski, Spotlight Synthetic Aperture Radar Signal Processing Algorithms, ISBN 0-89006-728-7, Artech House, Inc., 1995.
[5] M. Denny, I. Scott, "Anomalous Propagation Limitations to High-Resolution SAR Performance", Proceedings of the 2002 IEEE Radar Conference, Long Beach, Calif., USA, p. 249-254, 22-25 Apr. 2002.
[6] Bryan L. Burns, J. Thomas Cordaro, "Imaging synthetic aperture radar", U.S. Pat. No. 5,608,404, Mar. 4, 1997.

Synthetic Aperture Radar (SAR) forms images of a scene by sampling energy from a scattered field along the radar's flight path and coherently processing the data. Coherence of the data set is facilitated by very accurately measuring the geometric relationship between the desired target scene and the radar's flight path, and accounting for this in the data processing. This requires measuring the radar's motion, or at least its relative motion, very accurately and with fractional-wavelength precision over the course of the synthetic aperture. Typically, an Inertial Measurement instrument is employed, and even this is often aided by Global Positioning Satellite navigation readings.

The raw SAR data is typically a two-dimensional array of complex data samples, with one dimension representing samples from echoes of individual pulses (fast-time), and the other dimension representing the pulse index number (slow-time). This collection is termed the phase history data. Since wideband modulation techniques, such as the Linear Frequency Modulated (LFM) chirp waveform, are normally used for individual pulses, the data needs to be processed, or compressed, in the intra-pulse or range direction to achieve the final desired range resolution. This is termed range-compression. The data needs further processing in the inter-pulse or azimuth direction to complete the image formation process. This is termed azimuth compression.

During the course of a synthetic aperture, as the radar's perspective towards a target scene changes, ranges to some target locations change or migrate relative to other target locations. This migration is deterministic and is compensated within the image formation process by algorithms such as the Polar Format Algorithm (PFA) developed by Walker (document [1] above).

Relatively small motion measurement errors manifest themselves principally as phase errors in the complex data samples, and if large enough become observable as a smearing, blurring, or other degradation in the image. For most SAR systems, however, the nature and degree of blurring is nearly identical in different parts of the degraded SAR image. This allows a measurement of the blurring function, and then a calculation of a suitable correction to be applied to the original data to compensate for the presumed motion error. Further processing then may yield a well-focused image devoid of the previously observable degradation. A number of algorithms exist to automatically focus the degraded image. While some measure and compensate blurring, others seek to optimize other measures, such as contrast ratio in the image. Collectively, these processes are termed "autofocus" algorithms. A very popular autofocus algorithm is the Phase Gradient Autofocus (PGA) algorithm described by Wahl, et. al. (document [2] above).

Very large relative motion measurement errors manifest themselves as an unexpected additional shifting or migration of target locations beyond the aforementioned deterministic migration during the course of the synthetic aperture. Degradation in images from data exhibiting errors of this magnitude are substantial, often rendering the image useless. Application of conventional autofocus techniques are unable to properly mitigate the image degradation.

A general presumption in the SAR community is that any motion measurement errors are less than the range resolution of the radar. Under this presumption, autofocus operations are conventionally applied to fully range-compressed images. Since autofocus typically requires iteratively processing the data into an image, efficiency is gained by repeating only the azimuth compression, and not the range compression operations. This presupposes that, for example, a radar with 2 cm nominal wavelength and 30 cm range resolution will never see more than $(4\pi/\lambda)\, \rho_r = 60\pi$ radians of phase error.

In addition to motion measurement errors, longer ranges impart greater deleterious atmospheric effects to the data, whereby electrical path lengths depart significantly from the physical path lengths. The electrical path length is related to the actual path length by the ratio of the average wavelength to the nominal wavelength, and accounts for atmospheric dielectric variations, refraction and other wave propagation phenomena. Since coherence depends on electrical path lengths, problematic errors similar to motion measurement errors may be induced by perturbations in the atmosphere's transmission characteristics in spite of perhaps otherwise adequate motion measurements.

While the presumption that apparent range errors are less than the radar's range resolution is often true, modern high-performance SARs can exceed this criterion. The drive for finer resolutions, longer ranges, and less expensive (and less accurate) motion measurement systems will increasingly cause situations where a target's echo return effectively exhibits a residual migration error exceeding one or more range resolution cells during the course of the synthetic aperture. This would doom to failure any autofocus scheme that presupposes otherwise, which includes autofocus schemes that operate only on fully range-compressed data. An example of this situation is illustrated by FIGS. 1 and 2. Initially, the re-sampled data is range-compressed as shown at R, and then azimuth-compressed as shown at A. These compression operations produce a complex image. As illustrated generally at 11, the average blurring function in the scene is measured, and it is assumed that this phenomenon is exclusively due to phase error. A phase correction vector that represents the inverse of the blurring function is applied to the range-compressed data 13, to de-convolve the blurring function. The resulting corrected range-compressed data 15 is then subjected to azimuth compression to re-form a more acceptably focused complex image at 17.

FIG. 2 illustrates the situation where a target's echo return exhibits a residual migration error that exceeds one or more range resolution cells during the course of the synthetic aperture. This is indicated generally at 23 in FIG. 2 by the irregularly shaped (not straight) configuration of the range-compressed data. Although the average blurring function in the scene can again be measured as indicated at 21, it is incorrect in this instance to assume that the blurring function is exclusively due to a phase error. A phase correction vector representing the inverse of the blurring function is applied to the range-compressed data to produce corrected range-compressed data at 25. After azimuth compression, the resulting complex image 27 is something other than an acceptably focused image, because the generation of the phase correction vector was constrained by the incorrect assumption that the range-compressed data at 23 is sufficiently "straight" (as was in fact the case in FIG. 1).

It is desirable in view of the foregoing to provide for correction of motion measurement errors that extend beyond the range resolution of a SAR. Exemplary embodiments of the invention can achieve this by effectively decreasing the range resolution of the SAR in order to permit measurement of the error. Other exemplary embodiments of the invention compare range profiles across the slow-time dimension in order to estimate the error. Once the error has been determined, appropriate frequency and phase correction can be applied to the uncompressed input data, after which range and azimuth compression can be performed to produce a desired SAR image.

DETAILED DESCRIPTION

Figure 1:
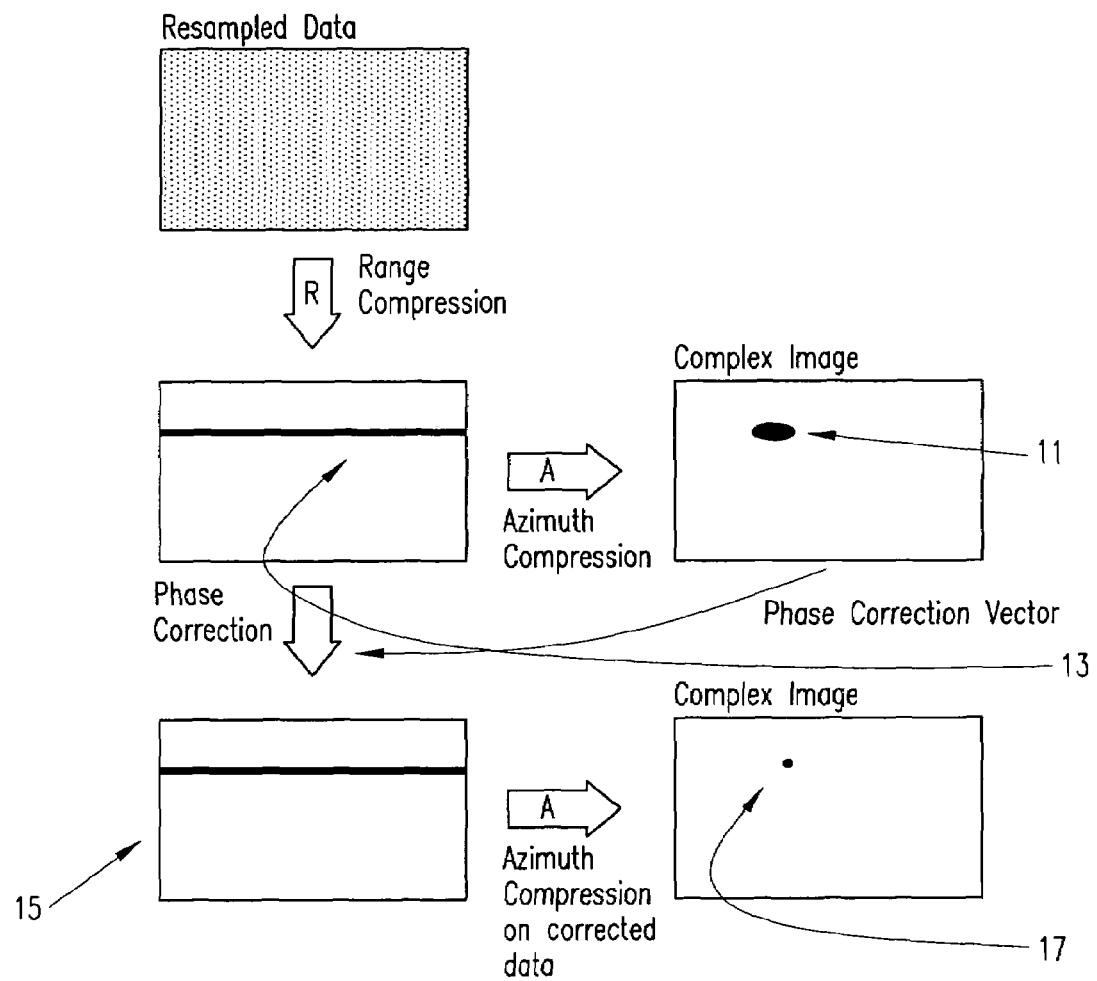
FIGS. 1 and 2 diagrammatically illustrate autofocus operations according to the prior art.
Figure 2:
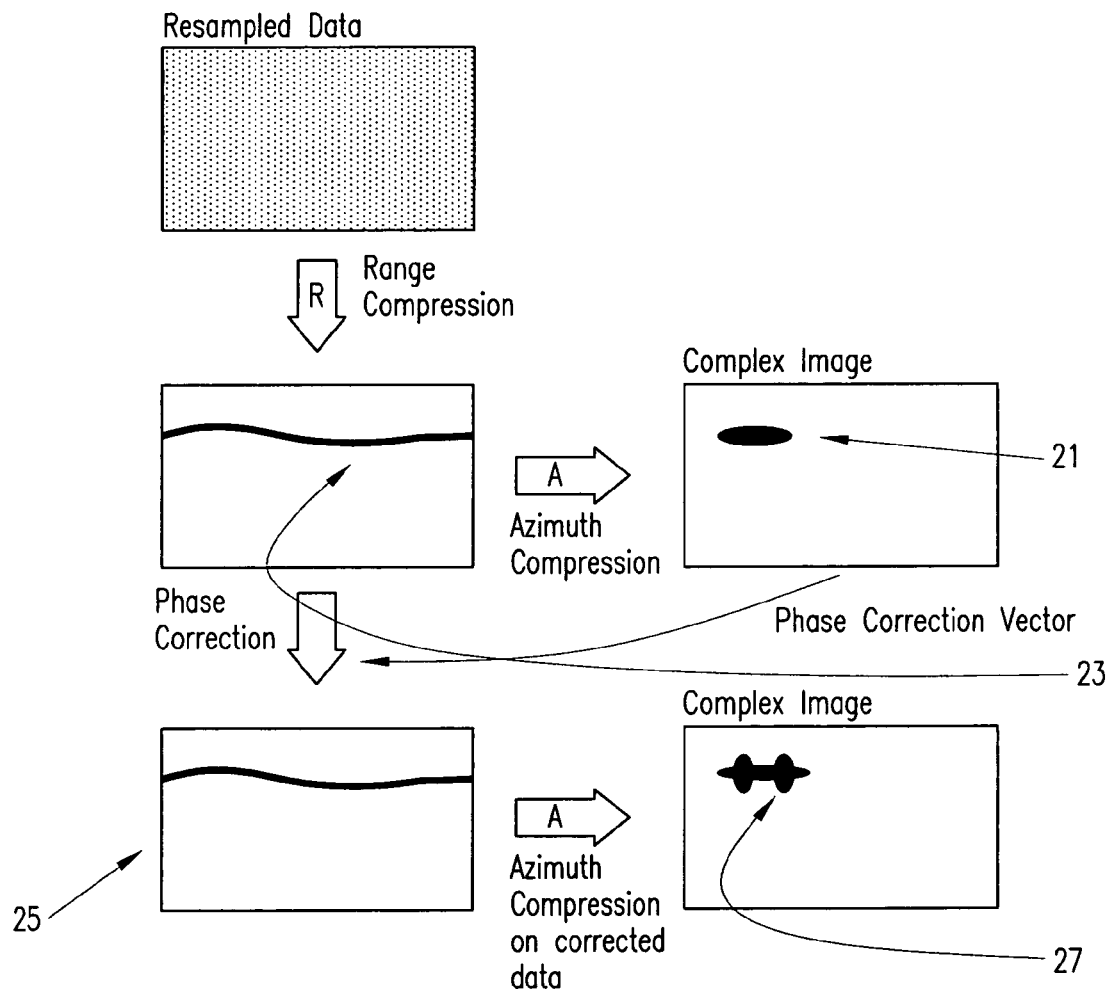

The present invention recognizes that a phase error function in the azimuth direction cannot be ascertained from a fully range-compressed data set, since the error energy is spread across several range resolution widths. Therefore, some embodiments impose the constraint that, for extracting an autofocus correction vector, the range resolution must be coarse enough to encompass the phase error. Put another way, the phase error is measured on data that is not fully range-compressed, i.e. radar data with degraded range resolution. This can be done in some embodiments by using only part of each return echo, that is, a portion of the fast-time vector. It can also be done in some embodiments by blurring fully range-compressed data in the range dimension. In embodiments that use range subapertures for image formation, a single range subaperture can be employed for phase-error measurement. Once an accurate phase error has been measured, then the corresponding migration effects can be calculated.

Some embodiments determine the actual migration effects by correlating range-compressed pulses with each other. This process of correlating range profiles obviates the need for identifying and selecting a prominent scatterer, allowing improved performance on SAR images that lack prominent scatterers.

Once the migration effects have been adequately characterized, compensation can then be applied to the SAR data. The excessive range migration should be mitigated, that is, excessive range shifts in range-compressed data should be eliminated. The echo returns should be shifted back into proper position. Range shifts in range-compressed data are achieved in some embodiments by multiplying the uncompressed data with a fast-time-dependent phase shift, that is, a complex sinusoid that shifts frequency in addition to phase.

Assume that the target is an isotropic point scatterer, and the waveform is a Linear Frequency Modulated (LFM) chirp. The radar echo from a point target may be adequately described in the phase history data by $$X_V(t, n) \approx A_s \mathrm{rect}\left(\frac{t - t_n - \frac{2}{c}|r_{s,n}|}{T}\right) \exp j\left\{\frac{2\omega_n}{c}\left[1 + \frac{\gamma_n}{\omega_n}\left(t - t_n - \frac{2}{c}|r_{c,n}|\right)\right](|r_{c,n}| - |r_{s,n}|)\right\} \quad (1)$$

where
 $A_s$=the target response amplitude,
 T=pulse width of the radar,
 n=the slow-time pulse index number with N/2≦n<N/2,
 $\omega_n$=the center frequency of the nth pulse,
 $\gamma_n$=the chirp rate of the nth pulse,
 $t_n$=time of the nth pulse,
 t=time,
 c=the velocity of propagation,
 $r_{c,n}$=vector from the target scene focal point to the radar for the nth pulse, and $r_{s,n}$=vector from the specific point target to the radar for the nth pulse.

The radar's motion measurement system measures $r_{c,n}$. If the measurement is in error by some vector $\epsilon_n$ for the nth pulse, then the echo data will be of the form $$X_V(t,n) \approx A_s rect\left(\frac{t-t_n-\frac{2}{c}|r_{s,n}|}{T}\right) \exp j\left\{\frac{2\omega_n}{c}\left[1+\frac{\gamma_n}{\omega_n}\left(t-t_n-\frac{2}{c}|r_{c,n}+\epsilon|\right)\right](|r_{c,n}+\epsilon_n|-|r_{s,n}|)\right\} \quad (2)$$

Particularly problematic is the line-of-sight component of the motion measurement error, that we denote $$\varepsilon_n = \frac{\epsilon_n \cdot r_{c,n}}{|r_{c,n}|}. \quad (3)$$

Other error components have minor impact on SAR image quality by comparison.

$$X_V(t,n) \approx A_s rect\left(\frac{t-t_n-\frac{2}{c}|r_{s,n}|}{T}\right) \exp j\left\{\frac{2\omega_n}{c}\left[1+\frac{\gamma_n}{\omega_n}\left(t-t_n-\frac{2}{c}|r_{c,n}|-\frac{2}{c}\varepsilon_n\right)\right](|r_{c,n}|-|r_{s,n}|+\varepsilon_n)\right\} \quad (4)$$

After sampling, the digital data set is described by $$X_V(i,n) \approx A_s \exp j\left\{\frac{2\omega_n}{c}\left[1-\left(\frac{2\gamma_n}{\omega_n c}\right)\varepsilon_n + \frac{\gamma_n}{\omega_n}T_{s,n}i\right](|r_{c,n}|-|r_{s,n}|+\varepsilon_n)\right\} \quad (5)$$

where $T_{s,n}$=the fast-time sampling period for the nth pulse, and
i=the fast-time sample index number with $I/2 \leq i < I/2$.

By making the usual assumption of a flat image plane, we identify $$|r_{c,n}|-|r_{s,n}| \approx \cos\psi_n \cos\alpha_n\left(s_x \tan\alpha_n - \frac{s_r}{\cos\psi_0}\right) \quad (6)$$

where $s_x$=target offset from scene focal point in the azimuth direction,
$s_r$=target offset from scene focal point in the slant-range direction,
$\psi_n$=actual pulse-to-pulse grazing angle for $r_{c,n}$,
$\psi_0$=single nominal grazing angle for all $r_{c,n}$, and
$\alpha_n$=azimuthal angle for $r_{c,n}$, with respect to the center of the synthetic aperture.

By further noting that the first occurrence of $\epsilon_n$ is of negligible practical consequence, the digital data can then be expanded to $$X_V(i,n) \approx A_s \exp j\left\{\frac{2\omega_n}{c}\left[1+\frac{\gamma_n}{\omega_n}(T_{s,n}i)\right]\cos\psi_n\cos\alpha_n\left(s_x\tan\alpha_n - \frac{s_r-\left(\frac{\cos\psi_0}{\cos\psi_n\cos\alpha_n}\right)\varepsilon_n}{\cos\psi_0}\right)\right\} \quad (7)$$

Deterministic migration is compensated by sampling/resampling the data onto a rectangular grid prior to application of efficient Fast Fourier Transform techniques. This may be accomplished by well-known methods and effects $$(\Xi_n T_{s,n} \cos\psi_n \cos\alpha_n)i = (\gamma_0 T_{s,0} \cos\psi_0)i', \text{ and} \quad (8)$$

$$(\omega_n \cos\psi_n \cos\alpha_n + (\gamma_0 T_{s,0}\cos\psi_0)i')\tan\alpha_n = (\omega_0 \cos\psi_0 d\alpha)n' \quad (9)$$

where $d\alpha$=a nominal azimuth sampling frequency scale factor,
$\omega_0$=the nominal center frequency,
$\gamma_0$=the nominal chirp rate,
$T_{s,0}$=the nominal fast-time sampling rate,
i'=the new fast-time sampling index with $I'/2 \leq i' < I'/2$,
n'=the new slow-time sampling index with $N'/2 \leq n' < N'/2$.

While this corrects for deterministic migration, it also impacts the nature of $\epsilon_n$ in the 'corrected' data. By defining $\epsilon_n$ as specifically a function of $\alpha_n$, its dependence on the new indices can be calculated as $$\varepsilon_n = \varepsilon(\alpha_n) = \varepsilon\left(atan\left(\frac{d\alpha n'}{\left(\frac{\omega_n}{\omega_0}\right)\left(\frac{\cos\psi_n\cos\alpha_n}{\cos\psi_0}\right) + \left(\frac{\gamma_0 T_{s,0}}{\omega_0}\right)i'}\right)\right). \quad (10)$$

For typical resolutions where the range of an is small, this approximates to $$\varepsilon_n \approx \varepsilon\left(\frac{d\alpha n'}{\left(\frac{\omega_n}{\omega_0}\right)\left(\frac{\cos\psi_n\cos\alpha_n}{\cos\psi_0}\right) + \left(\frac{\gamma_0 T_{s,0}}{\omega_0}\right)i'}\right). \quad (11)$$

A byproduct of the sampling/resampling is typically that $\omega_n = \omega_0 \cos\psi_0 / \cos\psi_n \cos\alpha_n$. The error then becomes $$\varepsilon_n \approx \varepsilon\left(\frac{d\alpha n'}{1\left(\frac{\gamma_0 T_{s,0}}{\omega_0}\right)i'}\right). \quad (12)$$

Data corrected for deterministic migration to facilitate image formation using for example the Polar Format Algorithm yields $$X_V(i',n') \approx A_s \exp j\left\{\frac{2\omega_0}{c}\cos\psi_0 s_x d\alpha n' - \frac{2\gamma_0 T_{s,0}}{c}(s_r - \varepsilon'_{n',i'})i' - \frac{2\omega_0}{c}(s_r - \varepsilon'_{n',i'})\right\} \quad (13)$$

where the error term has been slightly modified and become $$\varepsilon'_{n',i'} = \left(\frac{\cos\psi_0}{\cos\psi_n \cos\alpha_n}\right)\varepsilon_n. \quad (14)$$

As a practical matter, it is often adequate to assume, $$\varepsilon'_{n',i'} \approx \varepsilon_n. \quad (15)$$

By recognizing that the achievable nominal resolutions of this data set are $$\rho_r = \frac{2\pi c}{2\gamma_0 T_{s,0} I'} = \text{slant range resolution, and} \quad (16)$$

$$\rho_a = \frac{2\pi c}{2\omega_0 N' d\alpha \cos\psi_0} = \text{azimuth resolution,} \quad (17)$$

and ignoring a constant phase term, the data model may be rewritten as $$X_V(i', n') \approx A_s \exp j\left\{\frac{2\pi}{N'}\left(\frac{s_x}{\rho_a}\right)n' - \frac{2\pi}{I'}\left(\frac{s_r - \varepsilon'_{n'-i'}}{\rho_r}\right)i' + \frac{4\pi}{\lambda_0}\varepsilon'_{n',i'}\right\} \quad (18)$$

where the nominal wavelength $\lambda_0 = 2\pi/\omega_0$.

A first order expansion of $\varepsilon'_{n',i'}$, yields approximately $$\varepsilon'_{n',i'} \approx \varepsilon'_{n',0} + \left(\frac{d\varepsilon'_{n',i'}}{di'}\right)i' \approx \varepsilon(d\alpha n') + \left(\frac{d\varepsilon(\alpha_n)}{d\alpha_n}\right)\left(\frac{d\alpha_n}{di'}\right)i' \quad (19)$$

or approximately $$\varepsilon'_{n',i'} \approx \varepsilon(d\alpha n') - \left(\frac{d\varepsilon(\alpha_n)}{d\alpha_n}\right)\left(\frac{\gamma_0 T_{s,0}}{\omega_0}\right)(d\alpha n')i'. \quad (20)$$

This allows the data model to be rewritten as $$X_V(i', n') \approx A_s \exp j\left\{\frac{2\pi}{N'}\left(\frac{s_x}{\rho_a}\right)n' + \frac{2\pi}{I'}\left(\frac{\varepsilon(d\alpha n') - \left(\frac{d\varepsilon(\alpha_n)}{d\alpha_n}\right)d\alpha n' - s_r}{\rho_r}\right)i' + \frac{4\pi}{\lambda_0}\varepsilon(d\alpha n')\right\}. \quad (21)$$

Recall that the Discrete Fourier Transform (DFT) of a finite-length complex exponential is given by $$\exp j\{\Omega i'\} \Leftrightarrow c\text{sinc}_{I'}\left(\frac{I'}{2\pi}\left(\Omega - \frac{2\pi}{I'}v\right)\right) \quad (22)$$

where $v$ = the frequency index, and $$c\text{sinc}_{I'}(x) = \frac{\sin(\pi x)}{\sin(\pi x/I')}\exp j\{-\pi x/I'\}$$

Note that for small $(x/I')$ this approaches $$c\text{sinc}_{I'}(x) \xrightarrow[\text{small }(x/I')]{} I' \text{sinc}(x) = \frac{I' \sin(\pi x)}{\pi x} \quad (23)$$

and has peak value at $x=0$, and effective unit width, that is, the bulk of its energy falling in the domain $-\frac{1}{2} \leq x \leq \frac{1}{2}$. Energy outside these limits is generally unusable in addition to being undesirable.

Range compression on our data model entails performing a DFT over index i'. This yields $$X_{RC}(v, n') \approx A_s c\text{sinc}_{I'}\left(\left(\frac{\varepsilon(d\alpha n') - \left(\frac{d\varepsilon(\alpha_n)}{d\alpha_n}\right)d\alpha n' - s_r}{\rho_r}\right) - v\right)\exp j\left\{\frac{2\pi}{N'}\left(\frac{s_x}{\rho_a}\right)n' + \frac{4\pi}{\lambda_0}\varepsilon(d\alpha n')\right\}. \quad (24)$$

Although this expression was developed by range-compressing the resampled phase history data, it should also be obvious that the same form for the data can be achieved by beginning with an image and undoing the azimuth compression step. Furthermore, resampled pseudo-phase history data can be generated by undoing the range compression as well.

This expression has a peak response in range at the index value $$v_{peak} = \left(\frac{\varepsilon(d\alpha n') - \left(\frac{d\varepsilon(\alpha_n)}{d\alpha_n}\right)d\alpha n' - s_r}{\rho_r}\right) \quad (25)$$

with energy concentrated in a region of unit width around the peak. Note that this strip is a function of n', that is, the peak location $v_{peak}$ depends on (migrates with) n'. For a single index value v to harbor all the energy requires the constraint $$\left|\varepsilon(d\alpha n') - \left(\frac{d\varepsilon(\alpha_n)}{d\alpha_n}\right)d\alpha n'\right| \leq \rho_r. \quad (26)$$

This is the customary presumption for autofocus algorithms, as it allows the further approximation $$X_{RC}(v, n') \approx A_s c\text{sinc}_{I'}\left(\left(\frac{-s_r}{\rho_r}\right) - v\right)\exp j\left\{\frac{2\pi}{N'}\left(\frac{s_x}{\rho_a}\right)n' + \frac{4\pi}{\lambda_0}\varepsilon(d\alpha n')\right\} \quad (27)$$

where the original motion error manifests itself only as an azimuth phase error in the range-compressed data, and furthermore is confined to a single range bin for any one scatterer.

Exemplary embodiments of the invention can mitigate the effects of $\varepsilon_n$ when the customary constraint in equation (26) is violated and excessive migration occurs. The first step is to characterize the error, that is, finding $\epsilon_n$ or equivalent. The second step is to correct the pre-range-compressed data using this information, and then continue image formation. Various embodiments use various techniques for finding $\epsilon_n$ and correcting the data.

Exemplary embodiments of the invention measure a phase error, and calculate a corresponding range-shift. Then phase and frequency corrections are applied to the data to correct both. If equation (26) is satisfied, then $\epsilon_n$ can be determined in any number of proven manners that rely on a scatterer's energy remaining in a single range resolution cell. For example, one technique with wide popularity is the robust aforementioned Phase Gradient Autofocus (PGA) algorithm.

If equation (26) is violated, various embodiments process the data to a new coarser range resolution $p'_r$, so that equation (26) is met with the new resolution. Once done, then $\epsilon_n$ can be found from the new range-compressed (to the coarser resolution) data using existing techniques such as PGA.

The coarser range-resolution may be accomplished in any suitable manner. For example, the complex data can be filtered or blurred in the range dimension, as shown generally at 35 in FIG. 3. Alternatively, a subset (in the fast-time dimension) of the phase history data set can be used that limits resolution to the desired $p'_r$, as shown generally at 44 and 45 in FIG. 4. In any case, it becomes crucial to select a $p'_r$ that is large enough to accommodate any expected $\epsilon_n$.

Once the motion error $\epsilon_n$ has been estimated, and by extension $\epsilon_{n',i'}$ has been estimated, the pre-range-compressed data can be corrected by multiplying the data in the manner $$X_{V,corrected}(i',n') \approx X_V(i',n')\left[\exp j\left\{-\frac{2\pi}{I'}\left(\frac{\varepsilon'_{n',i'}}{\rho_r}\right)i' - \frac{4\pi}{\lambda_0}\varepsilon'_{n',i'}\right\}\right] \quad (28)$$

or approximately $$X_{V,corrected}(i',n') \approx \quad (29)$$
$$X_V(i',n')\exp j\left\{-\frac{2\pi}{I'}\left(\frac{\varepsilon(d\,an') - \left(\frac{d\varepsilon(\alpha_n)}{d\alpha_n}\right)d\,an'}{\rho_r}\right)i' - \frac{4\pi}{\lambda_0}\varepsilon(d\,an')\right\}$$

which yields the desired error-free model $$X_{V,corrected}(i',n') \approx A_s\exp j\left\{\frac{2\pi}{N'}\left(\frac{s_x}{\rho_a}\right)n' - \frac{2\pi}{I'}\left(\frac{s_r}{\rho_r}\right)i'\right\}. \quad (30)$$

Data corrected this way may be processed into an image in the usual manner, for example with a two-dimensional Fourier transform.

Note that the data correction is both a fast-time frequency shift and a phase shift. While typical autofocus algorithms are iterative for optimum performance, the frequency correction of a single iteration is adequate in some embodiments, although other embodiments also use iterative phase correction to derive additional benefit from further iterations. Once residual migration effects are contained within a range resolution cell, then some embodiments use conventional iterative autofocus techniques to "finish" the job.

Figure 3:
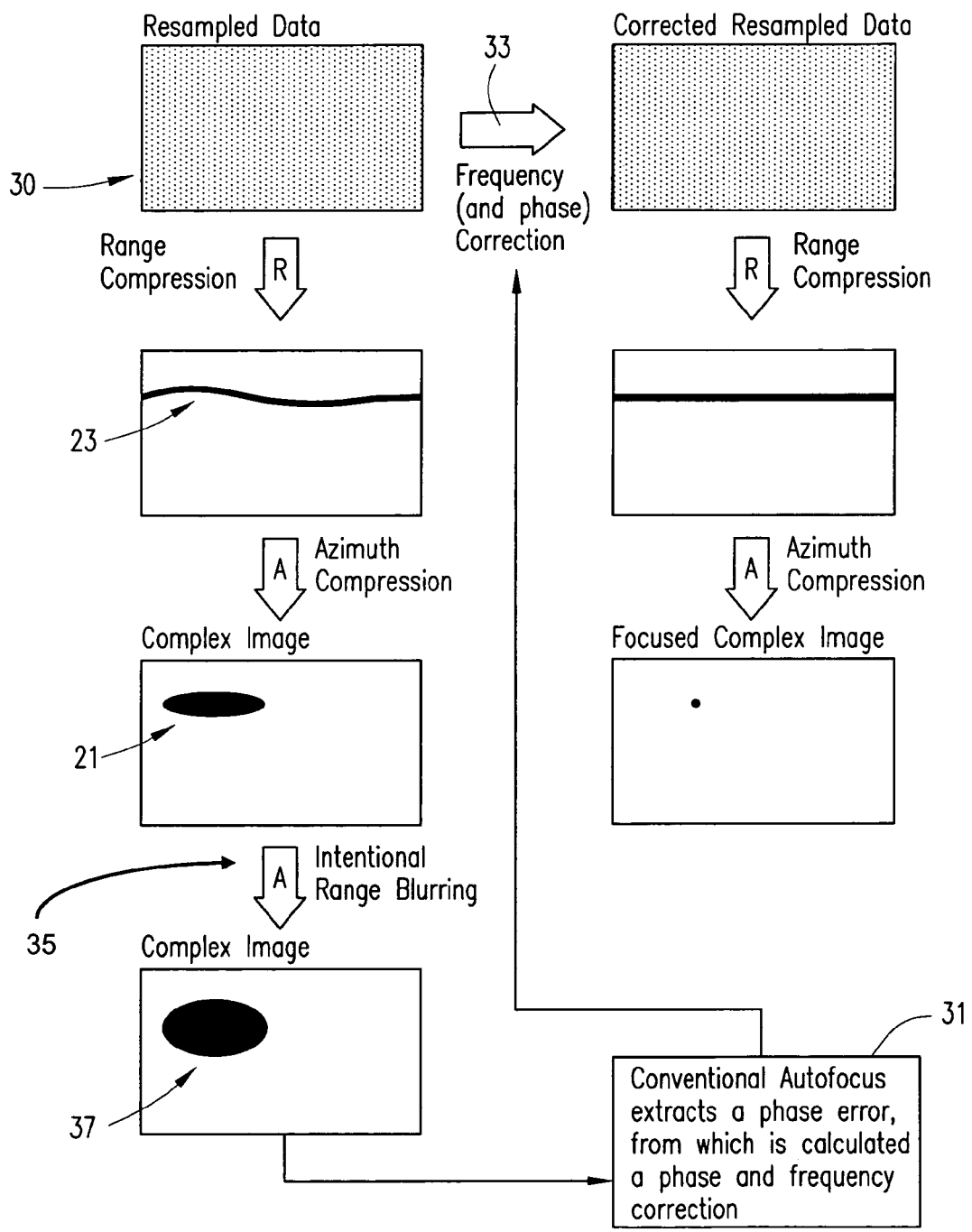
FIG. 3 diagrammatically illustrates intentional range blurring to achieve a decrease in range resolution that permits measurement of motion measurement errors according to exemplary embodiments of the invention.
Figure 4:
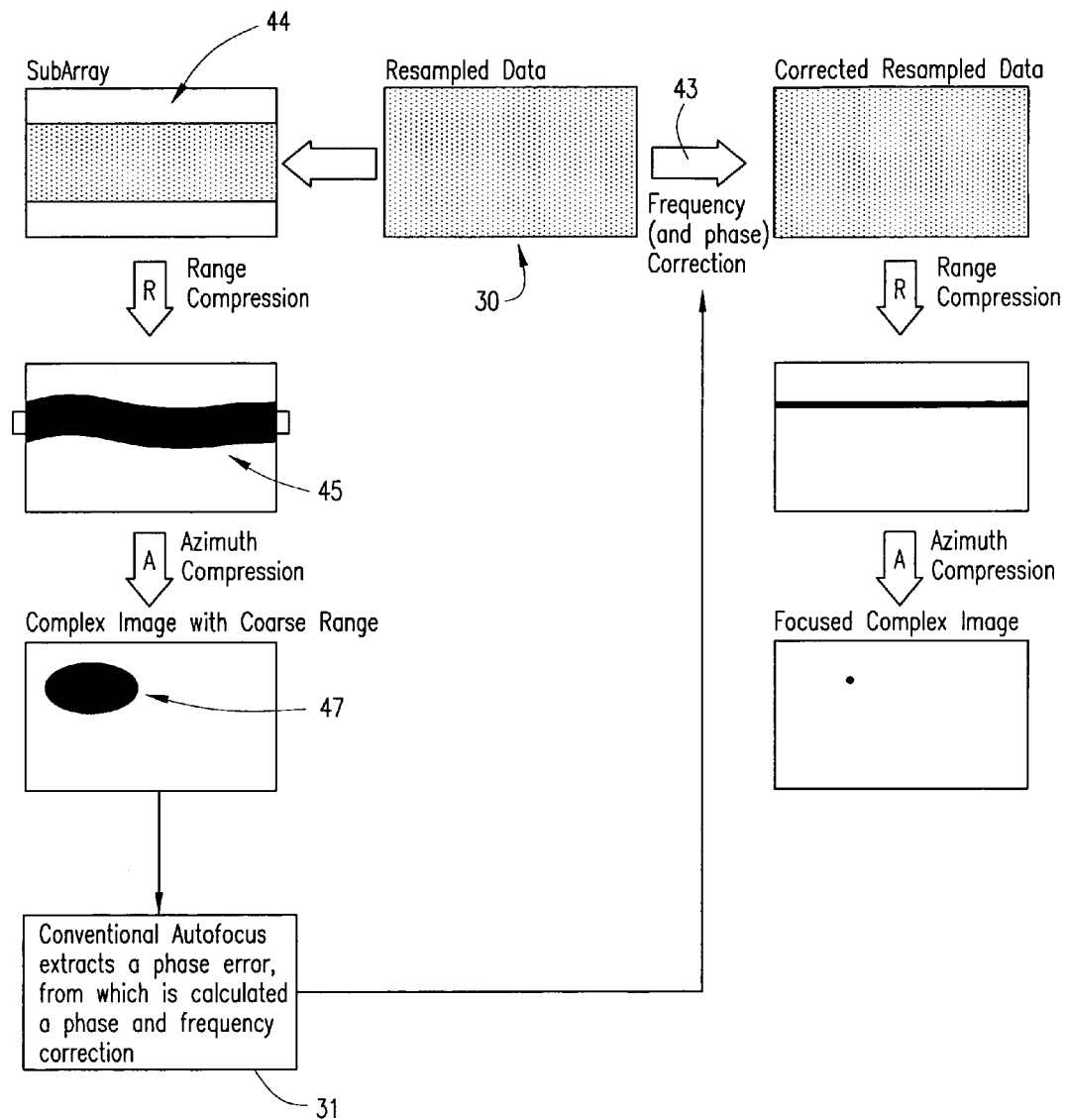
FIG. 4 diagrammatically illustrates the use of an input data subset in the fast-time dimension to achieve a decrease in range resolution that permits measurement of motion measurement errors according to exemplary embodiments of the invention.

In some embodiments, the process begins with the phase history data as shown at 30 in FIGS. 3 and 4. If significant deterministic migration exists, then it will first need to be mitigated with resampling. For relatively coarse resolution images, resampling may not be necessary. The input data is then formed into an image with a suitably coarse range resolution as shown at 37 in FIG. 3 and 47 in FIG. 4. Many conventional autofocus algorithms require some preliminary analysis of a completed (formed) image. The coarse-range-resolution image as shown at 37 in FIG. 3 and 47 in FIG. 4 is then input to a conventional autofocus algorithm (e.g. PGA) as shown at 31 in FIGS. 3 and 4. The phase error function is extracted, and the motion error $\epsilon_n$ (or equivalent) is ascertained. Phase and frequency corrections are then applied to the entire input data as shown at 33 in FIG. 3 and 43 in FIG. 4. Range and azimuth compressions are then performed to produce a complex image that is focused to the resolution that the data allows. Finally, a conventional autofocus algorithm (such as PGA) may be applied to the full-resolution image to further refine the focus, should the image require this.

Although the embodiments described above base their corrections on the determination of the quantity $\epsilon_n$, various other embodiments base their corrections on various other analogously determined quantities that are proportional to $\epsilon_n$.

Figure 5:
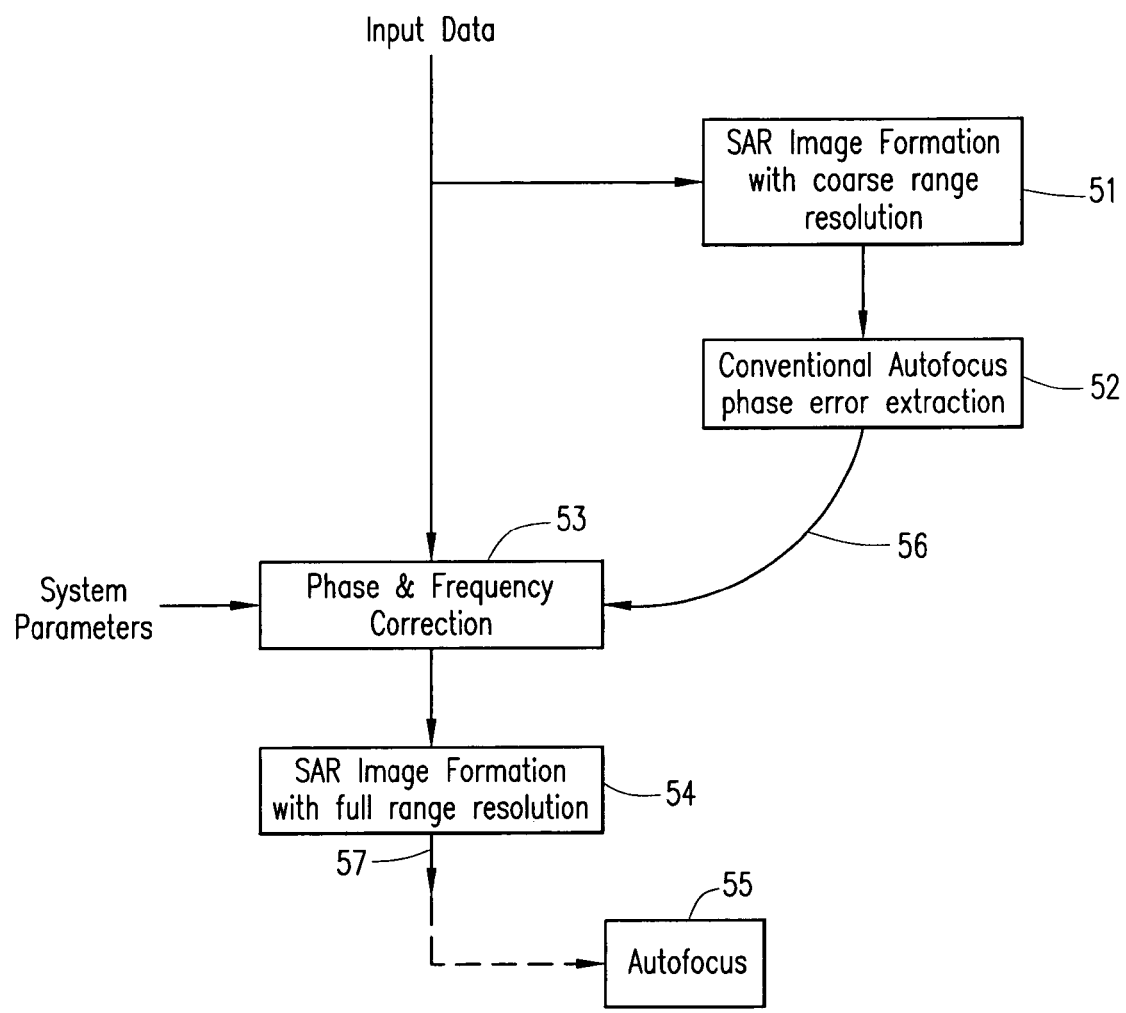
FIG. 5 diagrammatically illustrates a SAR image forming apparatus which can perform operations illustrated in FIGS. 3 and 4 according to exemplary embodiments of the invention.

FIG. 5 diagrammatically illustrates exemplary embodiments of a SAR image forming apparatus according to the invention. In various embodiments, the apparatus of FIG. 5 can perform exemplary operations illustrated in FIGS. 3 and 4. The input data in FIG. 5 can be phase history data, resampled phase history data, or range and azimuth-compressed data that has been range and azimuth-uncompressed. A SAR image former 51 receives the input data and forms a SAR image with a range resolution that is expected to be coarse enough to permit the motion measurement error to be captured. The coarsening of the range resolution can be implemented, for example, in any of the manners shown at 35 in FIG. 3, and at 44 and 45 in FIG. 4. The actual coarse resolution value must be greater than or equal to the expected motion error, which may be calculated from motion measurement instrument parameters and likely atmospheric characteristics. The SAR image with coarse range resolution is input to a conventional autofocus phase error extractor 52. This extractor 52 provides at 56 information indicative of the motion measurement error. This information 56 is provided to a phase and frequency corrector 53 which also receives the system parameter information required to implement equation (29). The corrector 53 implements equation (29), and thereby achieves the desired correction of the input data. The corrected data from the corrector 53 is provided to a SAR image former 54 which implements the full range resolution of the SAR, that is, a range resolution that is higher than the coarse range resolution implemented by the SAR image former 51. The SAR image former 54 produces an image that has been corrected for motion measurement errors that extend beyond the range resolution of the SAR. In some embodiments, the output 57 of the SAR image former 54 can be input to a conventional autofocus algorithm 55, as indicated by broken line in FIG. 5.

Some embodiments measure a range shift directly in the range-compressed data, and then compensate the input data with phase and frequency corrections. Tracking a point-like target in the range-compressed data (as in the prior art "Prominent Point Processing" of document [4] above) is inadequate in many instances because prominent point-like targets may not exist in the field of view of the radar. Exemplary embodiments of the invention correlate the entire range profile to establish a shift-gradient in the slow-time dimension.

Note that the range profile of a single point scatterer is given by $$\text{range profile} \approx \left| A_s c \operatorname{sinc}_{l'}\left(\left(\frac{\varepsilon(dan') - \left(\frac{d\varepsilon(\alpha_n)}{d\alpha_n}\right)dan' - s_r}{\rho_r}\right) - v\right)\right|. \quad (31)$$

As the error varies on a pulse-to-pulse basis, so does the peak value position for index v. Define the total apparent shift as $$\varepsilon_{apparent,n'} \approx \varepsilon(dan') - \left(\frac{d\varepsilon(\alpha_n)}{d\alpha_n}\right)dan'. \quad (32)$$

This is true for all scatterers at all ranges. In fact, as the peak varies on a pulse-to-pulse basis, so does the entire range profile shift proportionately. The nature of SAR data is that adjacent range profiles are very similar in shape, with the shape similarity diminishing with larger separations in index n'.

Figure 6:
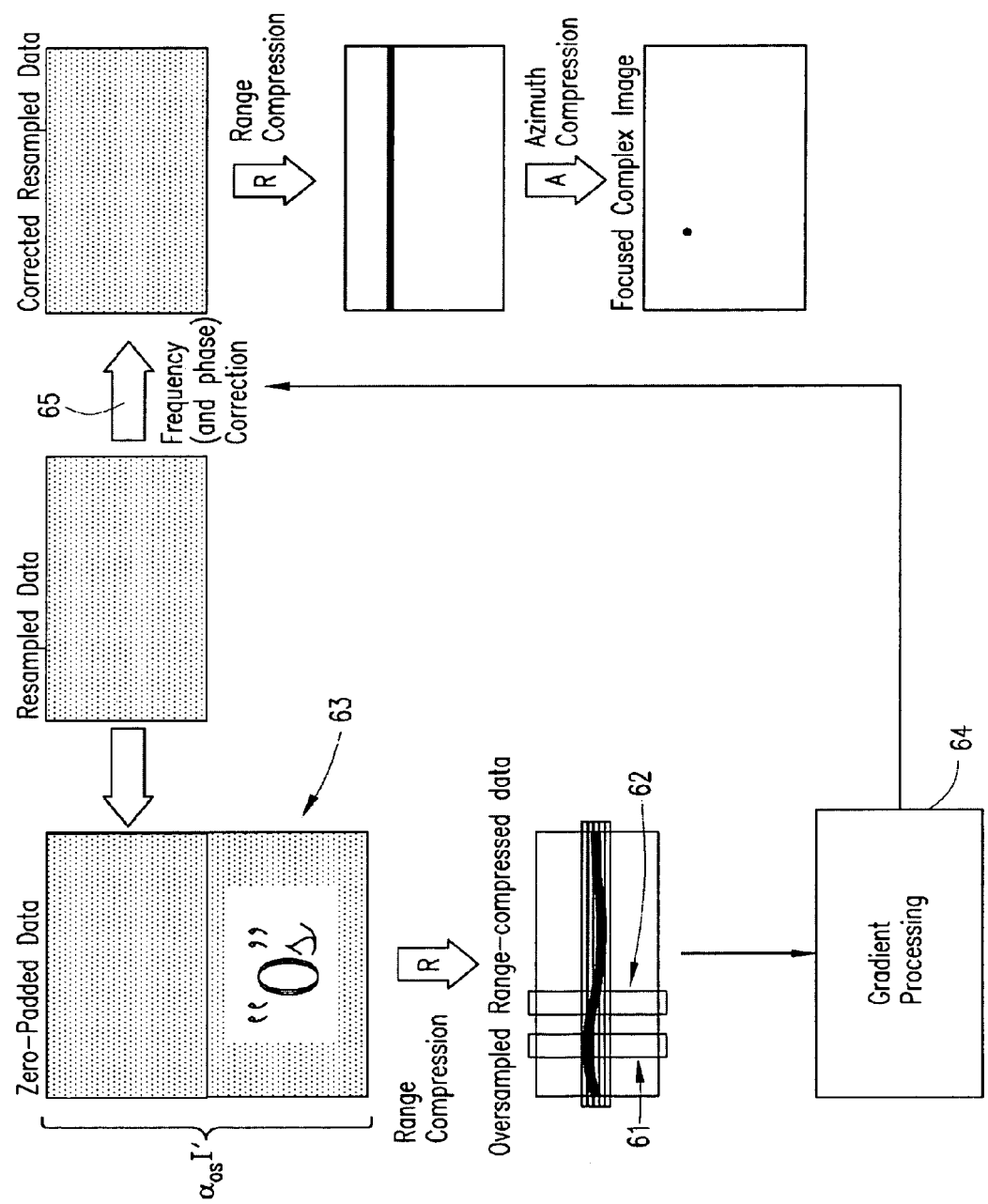
FIG. 6 diagrammatically illustrates comparison of range profiles across the slow-time dimension in order to permit estimation of motion measurement errors according to exemplary embodiments of the invention.

Comparing the profiles for different pulses n', e.g., profiles 61 and 62 in FIG. 6, will reveal a shift in the profiles that can only be dependent on changes in $\varepsilon_{apparent,n'}$. Consequently, by comparing adjacent pulses for the entire data set, a gradient $\Delta\varepsilon_{apparent,n'}$ is determined. By accumulating the gradients $\Delta\varepsilon_{apparent,n'}$, the actual function $\varepsilon_{apparent,n'}$ can be calculated to within an inconsequential constant bias.

In practice, the pulse-to-pulse error gradient $\Delta\varepsilon_{apparent,n'}$ is very small, and difficult to measure accurately. However, various embodiments use various techniques to alleviate this difficulty. In some embodiments, the range profile is interpolated to a much finer spacing by some factor $\alpha_{os}$ to allow measuring very small shifts in the correlation process. This interpolation is implemented in some embodiments by zero-padding the pre-range-compressed data set in the fast-time dimension to some new length $\alpha_{os}I'$ prior to the initial range compression, as illustrated at 63 in FIG. 6. Zero-padding techniques are well-known in the digital signal processing (DSP) art.

Because the gradient $\Delta\varepsilon_{apparent,n'}$ is in practice a relatively smooth function, it need not necessarily be calculated between adjacent pulses. Some embodiments therefore calculate an approximate gradient over a fairly large number of pulses, under the presumption that if some pulse n' at 61 is compared with some other pulse (n'+$n_0$) at 62, then the shift between these pulses is amplified from the pulse-to-pulse gradient by a factor $n_0$. Some embodiments therefore presume that $$\Delta\varepsilon_{apparent,n'} \approx \frac{\varepsilon_{apparent,n'+n_0} - \varepsilon_{apparent,n'}}{n_0} \quad (33)$$

Some embodiments select $n_0$ based on minimum slope arguments for a quadratic error, for example $$n_0 \geq NI(2\sqrt{2\alpha_{os}}). \quad (34)$$

Other embodiments use values for $n_0$ as small as $1/10$ the lower limit.

Once a gradient has been ascertained, an accumulation of the gradients yields an approximation of the actual function $\varepsilon_{apparent,n'}$ to within an inconsequential constant bias. The $\varepsilon_{apparent,n'}$ can be averaged to calculate a bias which can then be subtracted. Since $\varepsilon_{apparent,n'}$ is generally a smooth function, the estimate of $\varepsilon_{apparent,n'}$ using this technique can be smoothed to remove discontinuities and other unlikely anomalies resulting from measurements of noisy data.

The gradient processing described above is illustrated generally at 64 in FIG. 6.

The frequency correction to the pre-range-compressed data, shown at 65 in FIG. 6, need only be adequate to align the range profiles to within a range resolution cell width. With frequency corrections applied, additional and perhaps more accurate phase corrections can then be calculated using conventional autofocus techniques in the usual manner.

Referring to the example of FIG. 6, as with the examples of FIGS. 3 and 4, the process begins with the phase history data. If significant deterministic migration exists, then it will first need to be mitigated with resampling. For relatively coarse resolution images, resampling may not be necessary. The data is range-compressed with some degree of oversampling (effectuated by zero-padding). The resulting range profiles are then correlated at 64 with non-adjacent neighbors to enhance sensitivity to shift gradient. The gradients are then accumulated and smoothed at 64 to estimate the residual migration. This estimate is then used at 65 to correct the phase history data, and the corrected data then undergoes range and azimuth compression to form a complex image in the usual manner. Subsequent conventional autofocus algorithms then may be applied to further focus the image.

Figure 7:
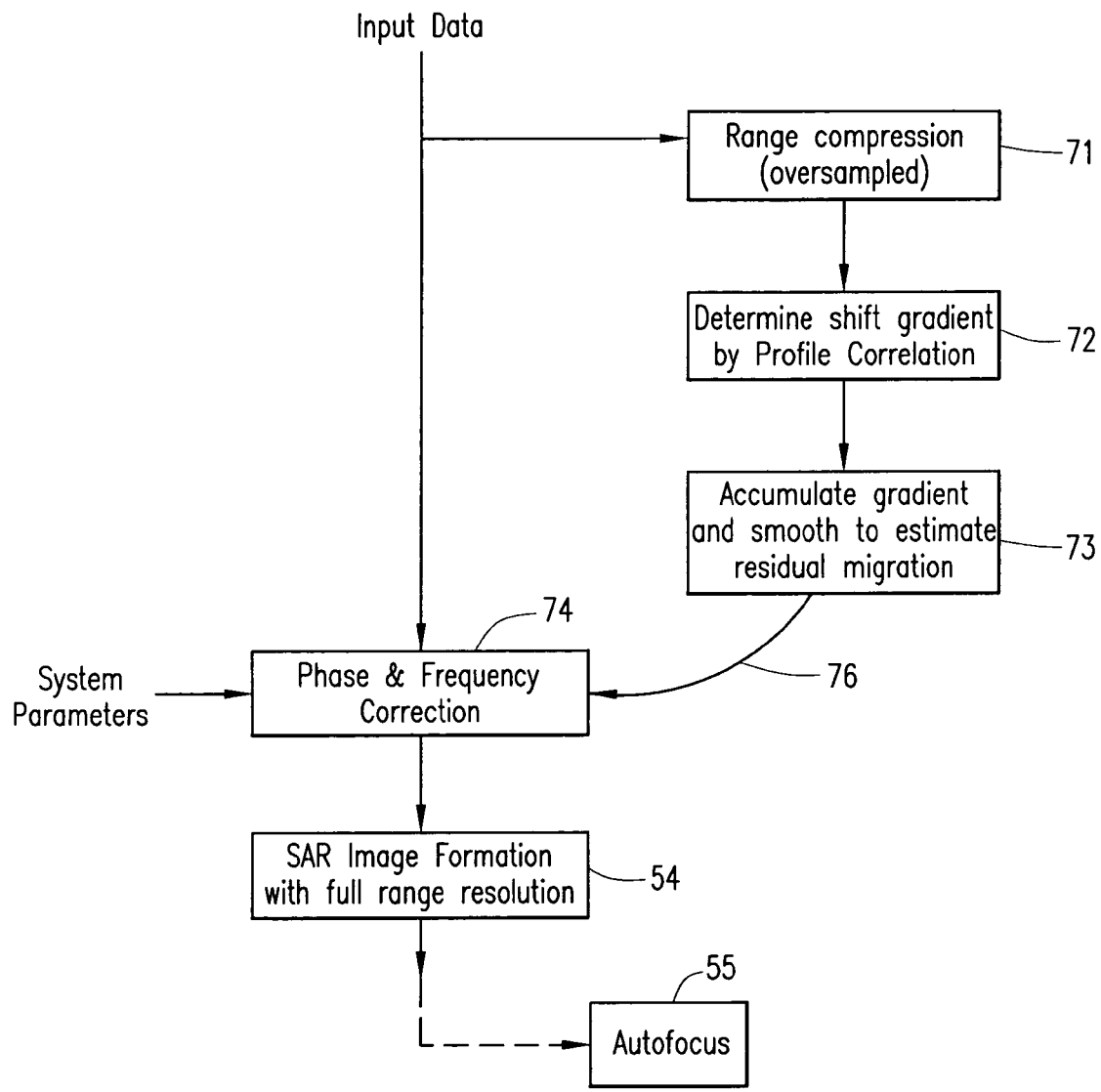
FIG. 7 diagrammatically illustrates a SAR image forming apparatus which can perform operations of FIG. 6 according to exemplary embodiments of the invention.

FIG. 7 diagrammatically illustrates a SAR image forming apparatus according to exemplary embodiments of the invention. In some embodiments, the apparatus of FIG. 7 can perform exemplary operations illustrated in FIG. 6. A range compressor 71 receives the input data and produces therefrom range-compressed data for output to a profile comparator 72 which compares range profiles to determine shift gradient information. The range-compressed data received by the profile comparator 72 can be oversampled as a result of zero-padding implemented by the range compressor 71, and/or the profile comparator can select range profiles that are suitably separated from one another by a factor $n_0$. An error estimator 73 receives the shift gradient information from the profile comparator 72, accumulates and smoothes the shift gradient information, and removes the constant bias, to produce a suitable estimate of the motion measurement error. The error estimator 73 provides at 76 information indicative of the estimated motion measurement error. A phase and frequency corrector 74 receives the information 76, along with the system parameters associated with equation (29). The corrector 74 implements equation (29), and thereby achieves the desired correction of the input data. The corrected data is output from the corrector 74 to a SAR image former 54. In some embodiments, the corrected image output from the SAR image former 54 can be applied to an autofocus algorithm 55, as shown by broken line in FIG. 7.

In some situations, phase history data may not be available or convenient. Undoing the azimuth and range compression operations on a complex image (as described above) provides an equivalent to resampled phase history data that will generally suffice for this purpose. In this manner, some embodiments permit even an image that has had conventional autofocus algorithms applied to it to be further corrected by the techniques of FIGS. 3-7. Furthermore, techniques of FIGS. 5 and 7 may be combined and sequentially applied in some embodiments, wherein proper relationships are maintained between error phase and frequency. In some embodiments, the corrected input data produced by one of FIGS. 5 and 7 would serve as the input data for the other of FIGS. 5 and 7.

Excessive residual migration due to motion errors, or apparent motion errors due in fact to atmospheric propagation phenomena, are not always correctable with conventional autofocus algorithms. Exemplary embodiments of the invention apply corrections before final range compression. Some embodiments apply both a frequency correction as well as a phase correction before final range compression. Some embodiments correct excessive migration in polar-reformatted data by correcting for both the motion error and the azimuthal derivative of the motion error. Some embodiments apply only a properly ascertained phase correction, which can improve the image. Some embodiments measure excessive migration by performing conventional autofocus steps on a reduced-range-resolution image, provided the reduced range-resolution is coarser than the residual migration. Excessive migration can also be estimated in some embodiments by correlating range profiles in range-compressed data. Sensitivity to range profile shifts, and hence migration, can be enhanced in some embodiments by oversampling the range compressed data in the range dimension, and in other embodiments by correlating range profiles that are separated in the slow-time dimension.

Workers in the art will recognize that the exemplary embodiments described above can be readily implemented by, for example, suitable modifications in the hardware, software, or both hardware and software, of conventional SAR image production systems, such as DSP-based systems.

Although exemplary embodiments of the invention have been described above in detail, this does not limit the scope of the invention, which can be practiced in a variety of embodiments.

What is claimed is:

1. A method of producing a SAR image, comprising:
   providing input data;
   forming a SAR image based on the input data, including range compressing at least some of the input data according to a first range resolution factor;
   applying a focusing algorithm to the SAR image to obtain information indicative of a motion measurement error associated with collection of the input data;
   using the motion measurement error information to modify the input data; and
   forming a further SAR image based on the modified input data, including range compressing the modified input data according to a second range resolution factor that defines a higher range resolution than said first range resolution factor.

2. The method of claim 1, wherein said first-mentioned range compressing step includes range compressing only a subset of the input data.

3. The method of claim 2, wherein said providing step includes providing the input data formatted in a two-dimensional array having a fast-time dimension and a slow-time dimension, and wherein said subset is a subset in the fast-time dimension.

4. The method of claim 1, including determining said first range resolution factor based on a motion measurement error that is expected to be associated with collection of the input data.

5. The method of claim 1, including applying a focusing algorithm to said further SAR image.

6. An apparatus for producing a SAR image, comprising:
   an input for receiving input data;
   a SAR image former coupled to said input for forming a SAR image based on the input data, said SAR image former range compressing at least some of the input data according to a first range resolution factor;
   an error extractor coupled to said SAR image former for applying a focusing algorithm to said SAR image to obtain information indicative of a motion measurement error associated with collection of the input data;
   a corrector coupled to said error extractor and said input for modifying the input data based on the motion measurement error information; and
   a SAR image former coupled to said corrector for forming a further SAR image based on the modified input data, said last-mentioned SAR image former range compressing the modified input data according to a second range resolution factor that defines a higher range resolution than said first range resolution factor.

7. The apparatus of claim 6, wherein said first range resolution factor defines a range resolution which is based on a motion measurement error that is expected to be associated with collection of the input data.

* * * * *